United States Patent [19]
Schmidt

[11] Patent Number: 5,315,300
[45] Date of Patent: May 24, 1994

[54] AES/EBU C BLOCK GENERATOR
[75] Inventor: David C. Schmidt, Jupiter, Fla.
[73] Assignee: Sony Electronics Inc., Park Ridge, N.J.
[21] Appl. No.: 953,098
[22] Filed: Sep. 29, 1992
[51] Int. Cl.$^5$ ............................................. H03M 7/00
[52] U.S. Cl. ..................................... 341/55; 370/58.1
[58] Field of Search ...................... 341/55, 51, 56, 70, 341/71, 81; 370/58.1, 60.1, 68; 381/80, 81

[56] References Cited
U.S. PATENT DOCUMENTS 5,199,030 3/1993 Ueda ..................................... 370/68
5,214,705 5/1993 Kloker et al. ............................ 381/2

Primary Examiner—Brian K. Young
Attorney, Agent, or Firm—Ronald P. Kananen

[57] ABSTRACT

The invention relates to a C block generator for generating the C bits for a plurality of devices using the AES-/EBU format. The C block generator preferably comprises an eight switch dip switch for selecting a desired one out of 256 possible C block sequences. The dip switch is connected to the upper eight bits of an EPROM's address input for indicating to the EPROM which sequence has been selected. The lower eight bits of the EPROM's address input are connected to an eight bit binary counter which is reset at the initiation of the transmission of each block. The EPROM uses the count from the counter to indicate which bit will be generated out of the selected sequence. Thus, as the count progresses, the generation of the sequence of C bits progresses in synchronism. The invention allows an operator to easily change the C block by simply opening or closing the appropriate switches on the dip switch. The invention also simplifies the design of systems using the AES/EBU format since a single C block may be used to generate the C bits for a plurality of devices.

16 Claims, 4 Drawing Sheets

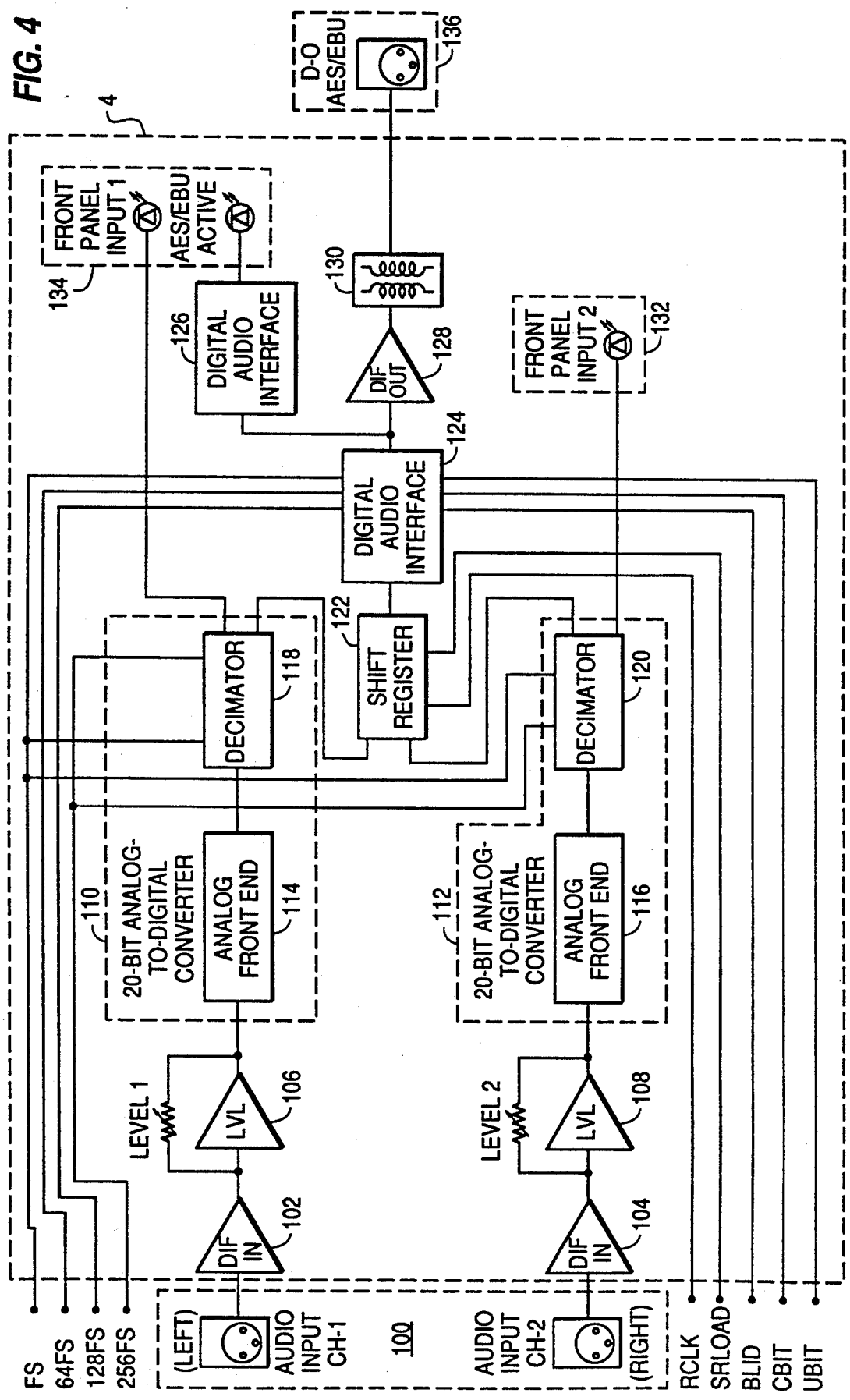

AES/EBU C BLOCK GENERATOR

BACKGROUND OF THE INVENTION

1. Field of the Invention

The invention generally relates to an apparatus for generating a selected sequence of data bits and, more particularly, to an apparatus for generating the C block in AES/EBU formatted data.

2. Description of Prior Art

One format for the serial transmission of digital audio data is called the AES/EBU format. With reference to FIG. 1, the AES/EBU format comprises individual frames transmitted at a selected sampling frequency. Each frame is comprised of two sequential sub-frames, Sub-frame A and Sub-frame B, with each sub-frame comprising 32 bits. The 32 bits of the sub-frame are divided into 4 Sync bits, 4 Auxiliary bits, 20 bits of Audio data, an Audio Sample Validity bit V, a User bit U, a Channel Status bit C, and a Parity bit P.

The frames of data are transmitted in blocks comprised of 192 frames. A C block is composed of all of the C bits in the 192 frames of a block and together comprise 24 bytes. The function of the C block is to transmit information about the format and about other system parameters. For instance, bits 6 and 7 of byte 0 in the C block indicate to a receiver of the AES/EBU formatted data whether the sampling frequency is 48 kHz, 44.1 kHz, or 32 kHz. Also, bits 2 to 4 of byte 0 indicate the type of emphasis: manual emphasis, no emphasis, CD emphasis, or CCITT emphasis. Therefore, the C block transmitted by a particular apparatus will vary depending upon the exact set-up of the audio system.

SUMMARY OF THE INVENTION

It is an object of the present invention to provide a C block generator which is capable of transmitting a plurality of different types of C blocks.

It is another object of the present invention to provide a C block generator which can easily change the C block being transmitted.

It is a further object of the present invention to provide a single C block generator for a plurality of devices transmitting data in the AES/EBU format.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, in accordance with the present invention, as embodied and broadly described herein, an apparatus for generating a desired sequence of bits comprises a selector for indicating the desired sequence of bits to be transmitted, a counter for successively counting the position of the bit in the sequence to be generated, a decoder for selecting the desired sequence of bits based on that selected by the selector and also for generating the bits in synchronism with the count. The decoder has an address signal comprised of a signal from the selector and a signal from the counter. The part of the address designated by the selector indicates to the decoder which sequence of bits should be selected while the other part of the address, that from the counter, informs the decoder which bit of the sequence should be generated. Thus, as the count progresses, the bits in the sequence are progressively generated.

BRIEF DESCRIPTION OF THE DRAWINGS

The accompanying drawings, which are incorporated in, and form a part of, the specification, illustrate an embodiment of the present invention and, together with the description, serve to explain the principles of the invention. In the drawings:

FIG. 4 is a block diagram of an A/D converter which uses the signals generated by the C block generator to generate data in the AES/EBU format.

DETAILED DESCRIPTION OF THE PREFERRED EMBODIMENT

Reference will now be made in detail to the preferred embodiment of the invention, an example of which is illustrated in the accompanying drawings.

Figure 1:
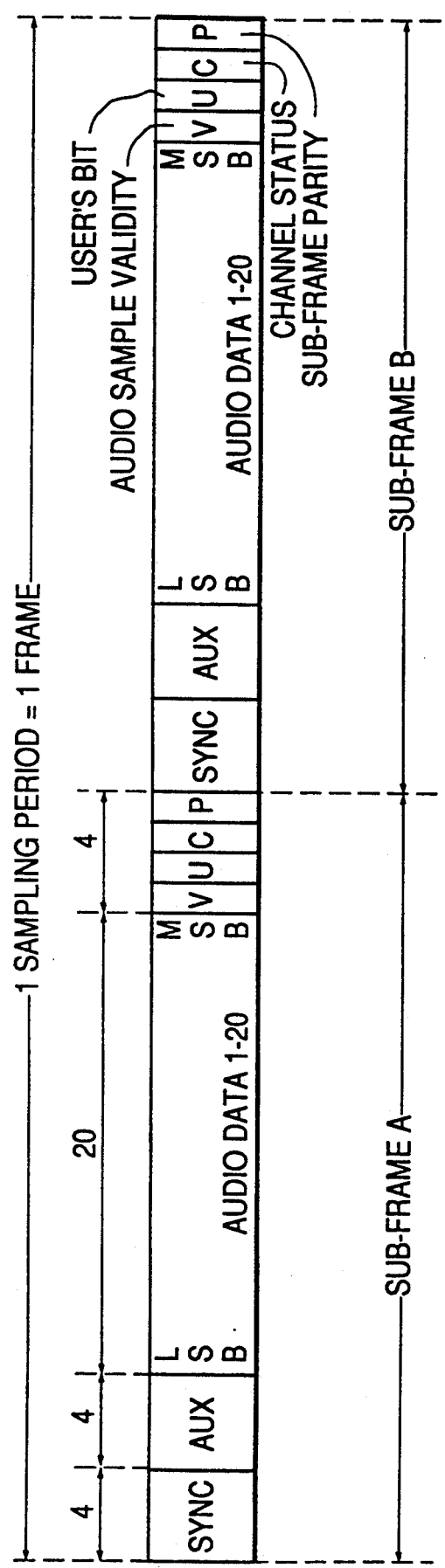
FIG. 1 is a chart of the AES/EBU format.
Figure 2:
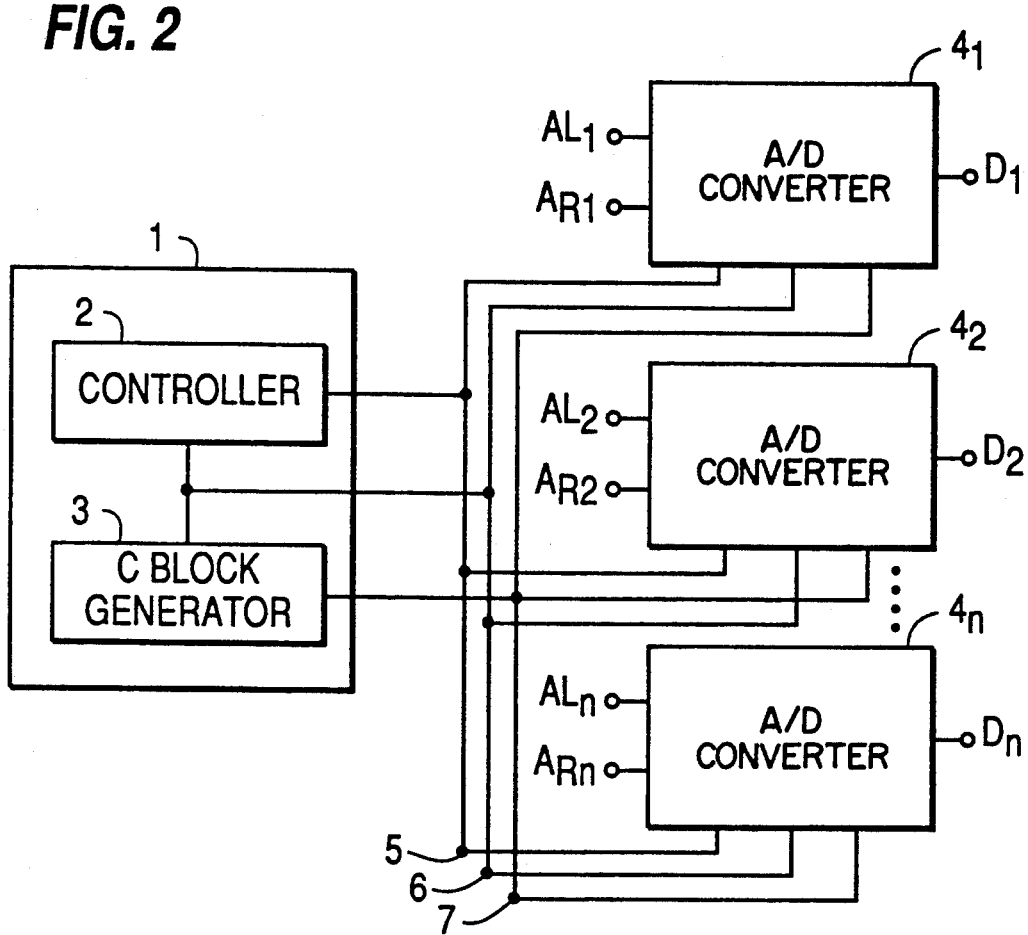
FIG. 2 is a block diagram of the C block controller in an audio system.

As shown in an embodiment of the invention in FIG. 2, a C block generator 3 receives control signals over a line 6 from a controller 2. Preferably, the controller 2 and the C block generator 3 may, for example, comprise an audio frame, such as the Sony DAF-4000, which may be used, for example, in a recording studio. The C block generator 3 transmits the C bits to a plurality of devices $4_1$ to $4_n$ over a line 7.

The plurality of devices $4_1$ to $4_n$ may, for example, comprise A/D converters, such as the Sony DABK-4001. Each of the A/D converters $4_1$ to $4_n$ receive left and right channel analog input signals and produce a digital output having the AES/EBU format. Also, besides receiving the C bit from the C block generator 3, the A/D converters $4_1$ to $4_n$ receive control signals from the controller 2 over lines 5 and 6.

During operation, the controller 2 controls the timing between the C block generator 3 and the A/D converters $4_1$ to $4_n$ as well as other controls over lines 5 and 6. The A/D converters $4_1$ to $4_n$ convert the analog signals into digital signals and formats the digital signals into the AES/EBU format by inserting the C bits supplied from the C block generator 3. Thus, separate C block generators within the individual A/D converters $4_1$ to $4_n$ are no longer necessary.

Figure 3:
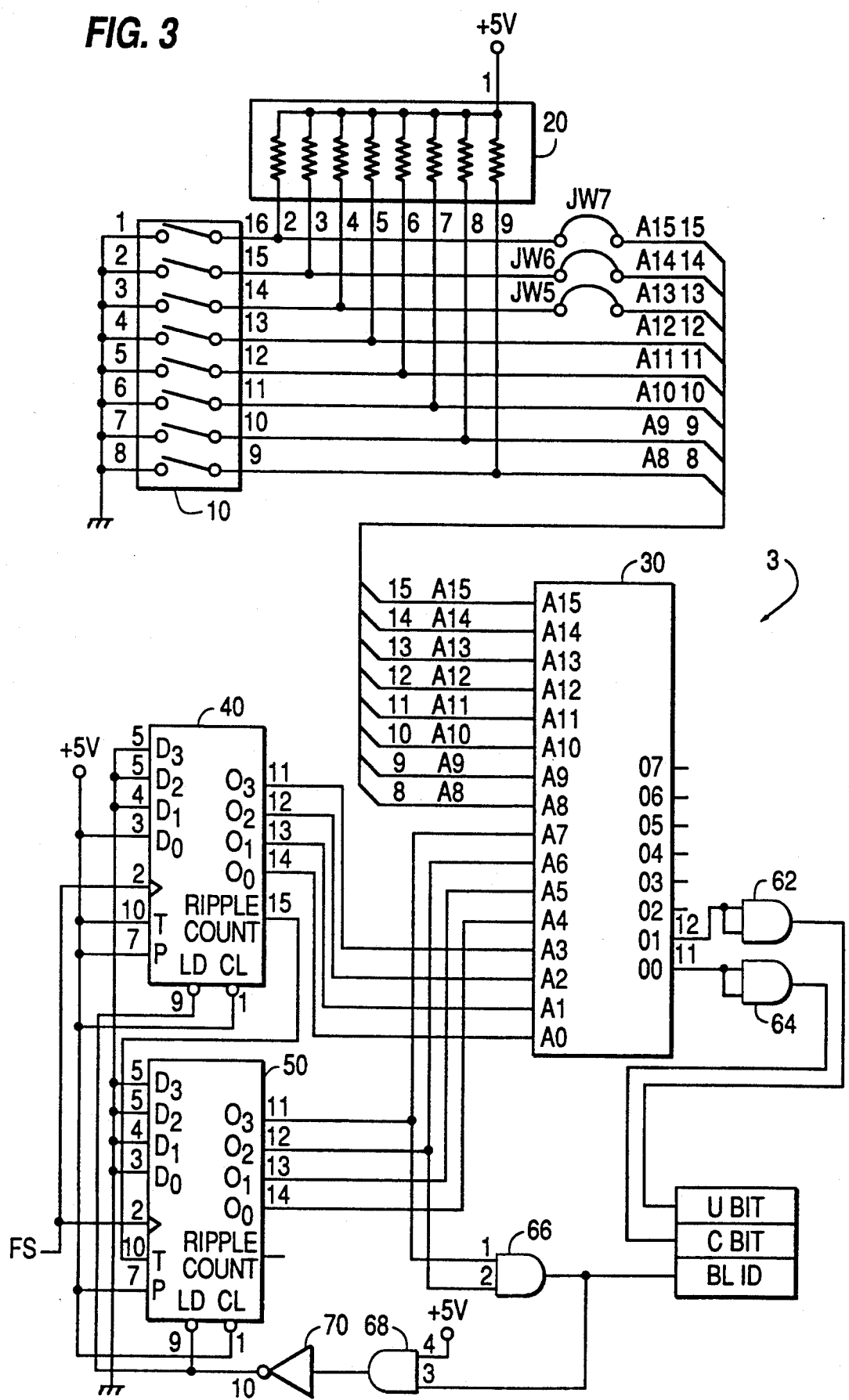
FIG. 3 is an embodiment of an electrical circuit for a C block generator.

An embodiment of the C block generator 3 is shown in FIG. 3. The C block generator 3 comprises a selector switch 10 which is preferably, for example, an eight switch dip switch. The eight switches on the dip switch 10 have one terminal connected to ground and the other terminal connected through a respective resistor in device 20 to a voltage, which is preferably, for example, 5 volts. Each of the other terminals in the dip switch 10 is also connected through a separate conductor line to an input on a decoder 30. Thus, by selectively opening or closing the eight switches on the dip switch 10, an operator may create logical "0"s or "1"s on the eight conductor lines and supply the decoder 30 with the created code to select a desired one out of 256 possible signals.

The C block generator 3 is also comprised of a counter, which is preferably, for example, an eight bit counter comprised of two binary counters 40 and 50. The counters 40 and 50 count the number of pulses of a sampling frequency FS and supply the eight digit count to the decoder 30.

An AND gate 66 receives the top two digits of the count as inputs and outputs a logical "1" when the count reaches a numerical value of 192. The output of the AND gate 66 is supplied through another AND gate 68, which has its other input tied high, and through an inverter 70 to the reset terminals of the counters 40 and 50. Thus, once 192 frames of data have been transmitted, or one full block, the AND gate 66 generates a "1" to reset the counters for the next block. The output of the AND gate 66 is also called the block ID signal, or BL ID signal, and is used to indicate the end of a block and to reset devices for the next block.

The decoder 30 is preferably, for example, an EPROM. The EPROM 30 receives the count from the counters 40 and 50 as the eight lower digits of an address and the signals from the eight switches on the dip switch 10 as the upper eight digits of the address. The EPROM generates a signal which is stored at the address designated by the counters 40 and 50 and the dip switch 10. As shown in FIG. 3, for example, bit 0 of the output is used as the C bit and may be supplied to a plurality of devices that generate data in the AES/EBU format. As the count from the counters 40 and 50 consecutively increases, the address designated in the EPROM consecutively increases so that the C bits stored consecutively in the EPROM 30 are also consecutively generated.

As a result of this design, an operator may select a desired C block with the selector switch 10. With an eight switch dip switch 10, for example, up to 256 different sequences of C bits may be selected. Thus, depending upon the specific configuration of the devices $4_1$ to $4_n$, the C block specific to that configuration may be easily selected by an operator by simply opening or closing the appropriate switches on the dip switch 10.

The eight lines from the dip switch 10 are applied to the upper eight digits of an address for the EPROM 30. The EPROM 30 is programmed so that the eight digits received from the dip switch 10 are used to designate the one desired sequence of C bits out of 256 possible sequences of C bits. In practice, an operator may have a table which references the specific system configuration with the appropriate positioning of the switches on the dip switch 10.

The EPROM is also programmed so that the eight bit count from the counters 40 and 50 designates the position in the selected sequence of the bit which is being transmitted by an associated device 4. In other words, if the tenth C bit in a block is being transmitted, the count from counter will be "0000 1010," thereby indicating the tenth position. The count is supplied to the EPROM so that the C bit in the tenth position of the desired sequence will be generated by the EPROM. Then, when the count increases to 11, the lower eight bits of the address will equal 11, and the eleventh C bit in the sequence will be generated by the EPROM 30. Therefore, as the count progresses, the transmission of the sequence of C bits progresses in synchronism.

In addition to the generation of the C block, the U block may also be generated. The EPROM 30 may be programmed so that the second bit of its output is the U bit. The U bit, C bit, and the block ID signal BL ID may all be transmitted together from the C block generator 3 to the plurality of devices $4_1$ to $4_n$.

A block diagram of an A/D converter 4 is shown in FIG. 4. Each of the A/D converters 4 has left and right channel inputs 100 which are respectively supplied to differential input amplifiers 102 and 104 and then to left and right channel headroom level adjusters 106 and 108. The output of the headroom level adjusters 106 and 108 are respectively supplied to left and right channel 20-bit A/D converters 110 and 112 and then to a shift register 122. At the shift register 122, the parallel digital data is converted into serial form. A digital audio interface 124 receives the block ID signal BL ID, the C bit, and the U bit from the C block generator 3. The digital audio interface 124 takes the digital audio data received from the shift register 122 and merges it with the C bit and U bit received from the C block generator 3 to generate data in the AES/EBU format.

The foregoing description of a preferred embodiment of the invention has been presented for purposes of illustration and description. It is not intended to be exhaustive or to limit the invention to the precise form disclosed. Many modifications and variations are possible in light of the above teaching.

For example, although an eight switch dip switch 10 was used as a selector, a dip switch having more or less switches or even another means for generating a coded signal may be used. Also, the counter 40 and 50 may be either larger or smaller depending upon the specific application. For example, the counter may be comprised of a four bit counter, twelve bit counter, a sixteen bit counter, etc. Additionally, although an EPROM 30 has been used as the decoder, other types, such as PLAs, PALs, or logic gates, may be used as well as other sizes of decoders. Further, the invention may be used for applications other than the generation of the C block or U block, such as whenever it is desirable to selectively transmit a desired sequence of data bits out of a plurality of possible data sequences.

The embodiment was chosen and described in order to best explain the principles of the invention and its practical application to thereby enable others skilled in the art to best utilize the invention and various embodiments and with various modifications as are suited to the particular use contemplated. It is intended that the scope of the invention only be limited by the claims appended hereto.

We claim:

1. An apparatus for selectively generating a data sequence, comprising:
    means for generating a sequence signal for indicating a desired data sequence out of a plurality of possible data sequences;
    means for counting a number of clock pulses and for generating a count signal corresponding to said number counted;
    decoding means for selecting said desired data sequence out of said plurality of sequences based on said sequence signal; and
    means, associated with said decoding means, for generating said bits of said desired data sequence in synchronism with said count signal;
    wherein a bit of said desired data sequence is generated by said generating means when said number from said count signal corresponds to a position of said bit within said desired data sequence.

2. An apparatus for selectively generating a data sequence, comprising:
    means for generating a sequence signal for indicating a desired data sequence out of a plurality of possible data sequences;

means for counting a number of clock pulses and for generating a count signal corresponding to said number counted;

decoding means for selecting said desired data sequence out of said plurality of sequences based on said sequence signal; and means, associated with said decoding means, for generating said bits of said desired data sequence in synchronism with said count signal;

wherein a bit of said desired data sequence is generated by said generating means when said number from said count signal corresponds to a position of said bit within said desired data sequence and wherein said means for generating a sequence signal comprises a dip switch.

3. An apparatus for selectively generating a data sequence, comprising:

means for generating a sequence signal for indicating a desired data sequence out of a plurality of possible data sequences;

means for counting a number of clock pulses and for generating a count signal corresponding to said number counted;

decoding means for selecting said desired data sequence out of said plurality of sequences based on said sequence signal; and means, associated with said decoding means, for generating said bits of said desired data sequence in synchronism with said count signal;

wherein a bit of said desired data sequence is generated by said generating means when said number from said count signal corresponds to a position of said bit within said desired data sequence and wherein said decoding means and said means for generating said bits comprise an EPROM.

4. An apparatus as set forth in claim 3, wherein an address signal for said EPROM comprises said sequence signal.

5. An apparatus for selectively generating a data sequence, comprising:

means for generating a sequence signal for indicating a desired data sequence out of a plurality of possible data sequences;

means for counting a number of clock pulses and for generating a count signal corresponding to said number counted;

decoding means for selecting said desired data sequence out of said plurality of sequences based on said sequence signal; and means, associated with said decoding means, for generating said bits of said desired data sequence in synchronism with said count signal;

wherein a bit of said desired data sequence is generated by said generating means when said number from said count signal corresponds to a position of said bit within said desired data sequence and wherein said plurality of data sequences comprises possible C blocks for use in an AES/EBU format code.

6. An apparatus as set forth in claim 5, wherein said means for generating said bits also generates U bits.

7. An apparatus for selectively generating a sequence of C bits in AES/EBU formatted data, comprising:

means for generating a sequence signal for indicating a desired sequence of C bits out of a plurality of possible sequences of C bits;

a counter for counting a number of clock pulses applied to an input terminal and for generating a count signal corresponding to said number counted;

a decoder for selecting said desired sequence of C bits out of said plurality of C bit sequences based on said sequence signal; and means, associated with said decoder, for generating said C bits of said desired sequence in synchronism with said count signal;

wherein a C bit of said desired sequence is generated by said generating means when said number from said count signal corresponds to a position of said C bit within said desired sequence.

8. An apparatus as set forth in claim 7, wherein said decoder and said means associated with said decoder comprises an EPROM having an address signal comprised of said sequence signal.

9. An apparatus as set forth in claim 7, wherein said sequence signal comprises an eight bit signal and said means for generating said sequence signal comprises a dip switch having eight selector switches.

10. An apparatus as set forth in claim 7, wherein said means for generating said bits also generates U bits.

11. An apparatus as set forth in claim 7, wherein said C bits are transmitted to a plurality of AES/EBU devices for the formation of AES/EBU formatted signals.

12. A method for selectively generating a data sequence, comprising the steps of:

generating a sequence signal for indicating a desired data sequence out of a plurality of possible data sequences;

counting a number of clock pulses and generating a count signal corresponding to said number counted;

selecting said desired sequence out of said plurality of sequences based on said sequence signal; and generating said bits of said desired data sequence in synchronism with said count signal;

wherein a bit of said desired data sequence is generated by said generating means when said number from said count signal corresponds to a position of said bit within said desired data sequence.

13. A method as set forth in claim 12, wherein said step of generating said sequence signal comprises the step of opening or closing switches on a dip switch.

14. A method as set forth in claim 12, wherein said step of selecting said desired sequence comprises the step of receiving at an EPROM an address signal partly comprised of said sequence signal.

15. A method as set forth in claim 12, wherein said step of generating said bits of said desired data sequence comprises the step of generating said bits at an address partly comprised of said count signal.

16. A method as set forth in claim 12, wherein said step of generating said bits comprises the step of transmitting said bits to a plurality of AES/EBU formatting devices.

* * * * *